(12) United States Patent
Kon (10) Patent No.: US 8,616,535 B2
(45) Date of Patent: Dec. 31, 2013

(54) ACTIVE VIBRATION ISOLATION SUPPORT SYSTEM

(75) Inventor: Hirozumi Kon, Miyagi (JP)

(73) Assignee: Keihin Corporation, Shinjuku-ku (JP)

( * ) Notice: Subject to any disclaimer, the term of this patent is extended or adjusted under 35 U.S.C. 154(b) by 779 days.

(21) Appl. No.: 12/166,691

(22) Filed: Jul. 2, 2008

(65) Prior Publication Data

US 2009/0009009 A1    Jan. 8, 2009

(30) Foreign Application Priority Data

Jul. 6, 2007  (JP) .................................. 2007-178865

(51) Int. Cl.
*F16F 13/00* (2006.01)
(52) U.S. Cl.
USPC ................................................... 267/140.14
(58) Field of Classification Search
USPC .................. 267/75, 140.14, 140.15; 310/194; 335/281, 282, 297, 299; 336/198
See application file for complete search history.

(56) References Cited

U.S. PATENT DOCUMENTS

| | | | |
|---|---|---|---|
| 2,895,063 | A | 7/1959 | Morris |
| 2,945,106 | A | 7/1960 | Moyer |
| 3,209,180 | A | 9/1965 | Doyle |
| 3,243,745 | A | 3/1966 | Glover et al. |
| 4,583,723 | A | 4/1986 | Ozawa |
| 4,899,996 | A | 2/1990 | Maassen et al. |
| 5,714,822 | A * | 2/1998 | Kawano et al. ............... 310/179 |
| 6,641,120 | B2 * | 11/2003 | Nemoto .................... 267/140.14 |
| 6,882,075 | B2 * | 4/2005 | Do et al. ....................... 310/194 |
| 6,972,500 | B2 * | 12/2005 | Kon et al. ....................... 310/14 |
| 2002/0105247 | A1 * | 8/2002 | Park ............................. 310/254 |
| 2002/0167243 | A1 * | 11/2002 | Horng et al. ................... 310/194 |
| 2005/0200061 | A1 | 9/2005 | Nemoto |
| 2007/0182077 | A1 * | 8/2007 | Kon ......................... 267/140.14 |

FOREIGN PATENT DOCUMENTS

| | | |
|---|---|---|
| JP | 63-99504 | 4/1988 |
| JP | 2002-198217 A | 7/2002 |
| JP | 2004-520796 A | 7/2004 |
| JP | 2004-289939 A | 10/2004 |
| JP | 2004-291737 A | 10/2004 |
| JP | 2004-297871 A | 10/2004 |
| JP | 2007-057074 A | 3/2007 |
| WO | WO 02/087060 A1 | 10/2002 |
| WO | WO 03/021754 A1 | 3/2003 |

* cited by examiner

*Primary Examiner* — Bradley King
*Assistant Examiner* — Stephen Bowes
(74) *Attorney, Agent, or Firm* — Arent Fox LLP (57) ABSTRACT

A yoke of an actuator of an active vibration isolation support system, which controls an internal pressure of a liquid chamber by reciprocally oscillating a movable core by energizing a coil, includes a cylindrical portion and a flange portion. The cylindrical portion is disposed on an outer side of the yoke in a radial direction and faces an inner peripheral surface of the coil, while the flange portion faces an end surface of the coil. The yoke further includes an inner inclined surface formed in an inner side of an intersection of the cylindrical portion and the flange portion, and inclined in such a manner that an outer side thereof in the radial direction with respect to an axis of an actuator inclines upward. Accordingly, the vector of a magnetic flux generated through the energization of the coil can be oriented toward the movable core from the flange portion of the yoke via the inner inclined surface thereof. The magnetic flux is thus allowed to flow smoothly from the yoke to the movable core, so that the efficiency of the magnetic circuit is enhanced. As a result, the operational response of the actuator can be improved.

2 Claims, 9 Drawing Sheets

ACTIVE VIBRATION ISOLATION SUPPORT SYSTEM

BACKGROUND OF THE INVENTION

1. Field of the Invention

The present invention relates to an active vibration isolation support system comprising: an actuator for reciprocally oscillating a movable core on an axis of the actuator by energizing a coil wound in a cylindrical shape; and a liquid chamber being disposed on the axis of the actuator, having a volume which varies depending on a load inputted thereto from an outside, and being connected to the movable core, so that an internal pressure of the liquid chamber is controlled.

2. Description of the Related Art

Such an active vibration isolation support system has been known as disclosed in Japanese Patent Application Laid-open No. 2004-291737. A yoke of an actuator of this active vibration isolation support system includes: a cylindrical portion extending in the axial direction so as to face an inner peripheral surface of an upper portion of a coil; and a flange portion extending in the radial direction so as to face an upper end surface of the coil. Moreover, the cylindrical portion and the flange portion are connected to each other as orthogonally intersecting each other.

When the coil of the actuator of this active vibration isolation support system is energized, the magnetic flux flows through a closed magnetic path from a fixed core, to a housing, to the yoke, to a movable core, and again to the fixed core, surrounding the coil. The flow of the magnetic flux causes the movable core to be attracted by the fixed core in such a manner that an air gap formed between the fixed and movable cores is reduced in size. In this event, if the magnetic flux can be caused to flow smoothly between the yoke and the movable core, the efficiency of the magnetic circuit is enhanced, and as a result, the operational response of the actuator can be improved.

SUMMARY OF THE INVENTION

The present invention has been made in view of the above-described circumstances. An object of the present invention is to improve the operational response of an actuator of an active vibration isolation support system by enhancing the efficiency of a magnetic circuit of the actuator.

In order to achieve the object, according to a first feature of the present invention, there is provided an active vibration isolation support system comprising: an actuator for reciprocally oscillating a movable core on an axis of the actuator by energizing a coil wound in a cylindrical shape; and a liquid chamber being disposed on the axis of the actuator, having a volume which varies depending on a load inputted thereto from an outside, and being connected to the movable core, so that an internal pressure of the liquid chamber is controlled, wherein the actuator comprises a yoke including: a cylindrical portion facing an inner peripheral surface of the coil; and a flange portion facing an end surface, on the liquid chamber side, of the coil, and an inner inclined surface is formed in an inner side of an intersection of the cylindrical portion and the flange portion, the inner inclined surface being inclined in such a manner that an outer side thereof in a radial direction with respect to the axis comes closer to the liquid chamber.

With the first feature of the present invention, the yoke of the actuator of the active vibration isolation support system, which controls the internal pressure of the liquid chamber by reciprocally oscillating the movable core through the energization of the coil, includes the cylindrical portion and the flange portion. Here, the cylindrical portion is disposed on the outer side of the yoke in the radial direction and faces the inner peripheral surface of the coil, while the flange portion faces the end surface, on the liquid chamber side, of the coil. In addition, the yoke further includes the inner inclined surface which formed in the inner side of the intersection of the cylindrical portion and the flange portion, and which is inclined in such a manner that the outer side thereof in the radial direction with respect to the axis of the actuator comes closer to the liquid chamber. Accordingly, the vector of the magnetic flux generated through the energization of the coil can be oriented toward the movable core from the flange portion of the yoke via the inner inclined surface thereof. The magnetic flux is thus allowed to flow smoothly from the yoke to the movable core, so that the efficiency of the magnetic circuit is enhanced. As a result, the operational response of the actuator can be improved.

According to a second feature of the present invention, in addition to the first feature, an outer inclined surface is formed in an outer side of the intersection of the cylindrical portion and the flange portion, the outer inclined surface being inclined in such a manner that an outer side thereof in the radial direction with respect to the axis comes close to the liquid chamber.

With the second feature of the present invention, the outer inclined surface is formed in the outer side of the intersection of the cylindrical portion and the flange portion, in addition to the inner inclined surface. Accordingly, an unnecessary increase in the thickness of the yoke can be prevented. As a result, it is possible to reduce the weight while avoiding reduction in the magnetic efficiency of the yoke defining the magnetic path.

According to a third feature of the present invention, in addition to the first or second feature, an end surface, on the liquid chamber side, of the coil is inclined in such a manner that an outer side thereof in the radial direction with respect to the axis comes closer to the liquid chamber.

With the third feature of the present invention, the end surface, on the liquid chamber side, of the coil is inclined in such a manner that the outer side thereof in the radial direction with respect to the axis comes closer to the liquid chamber. Accordingly, it is possible to increase the number of windings of the coil to enhance the output without increasing the dimension, in the direction of the axis, of the active vibration isolation support system. Further, if the coil is wound only the same number of times as that of the conventional coil, the outside diameter of the coil can be reduced as compared with that of the conventional coil, so that the total length of the wire of the coil can be shortened. Accordingly, since the resistance and inductance of the coil are reduced, the electric current response can be improved.

According to a fourth feature of the present invention, in addition to the third feature, the active vibration isolation support system comprising a bobbin around which the coil is wound, wherein a step portion extending in a circumferential direction with respect to the axis is formed on an inner surface of the bobbin, the inner surface being in contact with the inclined end surface of the coil.

With the fourth feature of the present invention, the step portion extending in the circumferential direction with respect to the axis is formed on the inner surface of the bobbin, which inner surface is in contact with the inclined end surface of the coil. Accordingly, when being wound around the bobbin, the wire of the coil is hung on the step portion, thus making it unlikely that the wound wire is loosened. As a result, the winding can be facilitated and also secured.

According to a fifth feature of the present invention, in addition to the third feature, the coil is a bobbinless coil, and a step portion extending in a circumferential direction with respect to the axis is formed on an inner surface of a plate, the inner surface being in contact with the inclined end surface of the coil.

With the fifth feature of the present invention, the step portion extending in the circumferential direction with respect to the axis is formed on the inner surface of the plate being in contact with the inclined end surface of the bobbinless coil. Accordingly, when being wound, the wire of the coil is hung on the step portion, thus making it unlikely that the wound wire would be loosened. As a result, the winding can be facilitated and also secured.

It should be noted that first and second liquid chambers 24 and 25 in the following embodiments correspond to a liquid chamber of the present invention, and an upper plate 72 of the embodiments corresponds to a plate of the present invention.

Hereinafter, embodiments of the present invention will be described with reference to the accompanying drawings.

BRIEF DESCRIPTION OF THE DRAWINGS

FIGS. 1 to 6 show a first embodiment of the present invention.

FIGS. 7 and 8 show a second embodiment of the present invention.

The third embodiment shown in FIG. 9A is a modification of the first embodiment (refer to FIG. 5), while the fourth embodiment shown in FIG. 9B is a modification of the second embodiment (refer to FIG. 8).

DESCRIPTION OF THE PREFERRED EMBODIMENT

Figure 1:
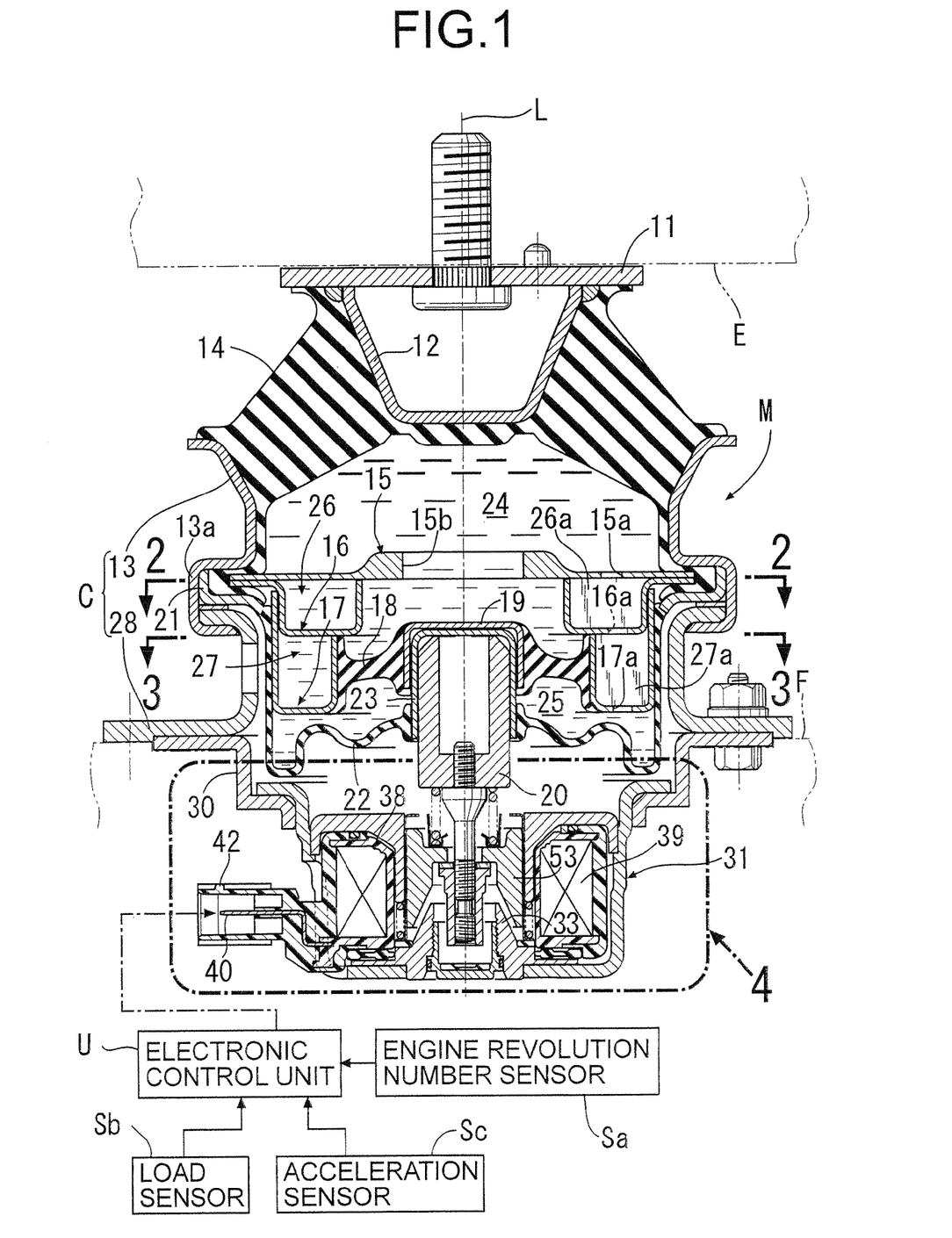
FIG. 1 is a vertical cross-sectional view of an active vibration isolation support system.

At first, referring to FIG. 1, an active vibration isolation support system M, including an electromagnetic actuator 31, of the present invention is interposed between an engine E and a vehicle body frame F in an automobile so as to elastically support the engine E on the vehicle body frame F.

The active vibration isolation support system M has a substantially axisymmetric structure with respect to an axis L. The active vibration isolation support system M includes: a plate-shaped mounting bracket 11 connected to the engine E; an inner tube 12 welded to the mounting bracket 11; an outer tube 13 arranged coaxially around an outer periphery of the inner tube 12; and a first elastic body 14 made of a thick rubber or the like, and bonded by vulcanization to conical surfaces, facing each other, of the respective inner and outer tubes 12 and 13. A first orifice-forming member 15, a second orifice-forming member 16, and a third orifice-forming member 17 are disposed below the first elastic body 14. The first to third orifice-forming members 15 to 17 are vertically arranged and integrated with one another.

The first orifice-forming member 15 has a discoidal shape, and has an aperture 15b formed in the center portion thereof. The second orifice-forming member 16 has an annular shape and a gutter-like cross section with an opened upper surface, and is integrally joined to the first orifice-forming member 15 in such a manner that the opened upper surface is closed by the first orifice-forming member 15. The third orifice-forming member 17 also has an annular shape and a gutter-like cross section with an opened upper surface, and is integrally joined to the second orifice-forming member 16 in such a manner that the opened upper surface is closed by the second orifice-forming member 16. The outer peripheral portions of the respective first and second orifice-forming members 15 and 16 are overlapped and integrated with each other, and fixed by an annular crimping portion 13a which is provided continuously at the lower portion of the outer tube 13.

An outer peripheral surface of an annular second elastic body 18 made of a rubber or the like is bonded by vulcanization to an inner peripheral surface of the third orifice-forming member 17. A first cap member 19 being disposed on the axis L and having an opened lower surface is bonded by vulcanization to an inner peripheral surface of the second elastic body 18. A second cap member 23 and a movable member 20 are sequentially press-fitted into, and thus fastened to, the first cap member 19. The second cap member 23 has a lower end portion which protrudes downward below the first cap member 19. An inner peripheral end portion of a diaphragm 22 disposed below the second elastic body 18 is bonded by vulcanization to an outer peripheral surface of the protruding portion of the second cap member 23. A ring member 21 is bonded by vulcanization to an outer periphery of the diaphragm 22. The ring member 21 is fixed together with the outer peripheral portions of the first and second orifice-forming members 15 and 16 by the crimping portion 13a. The movable member 20 can be vertically moved along with the first and second cap members 19 and 23 by flexure of the second elastic body 18 and the diaphragm 22.

A first liquid chamber 24 into which a liquid is sealedly filled is defined between the first elastic body 14 and the second elastic body 18, while a second liquid chamber 25 into which the liquid is filled as well is defined between the second elastic body 18 and the diaphragm 22. These first and second liquid chambers 24 and 25 communicate with each other through an upper orifice 26 and a lower orifice 27 which are formed by the first to third orifice-forming members 15 to 17.

Figure 2:
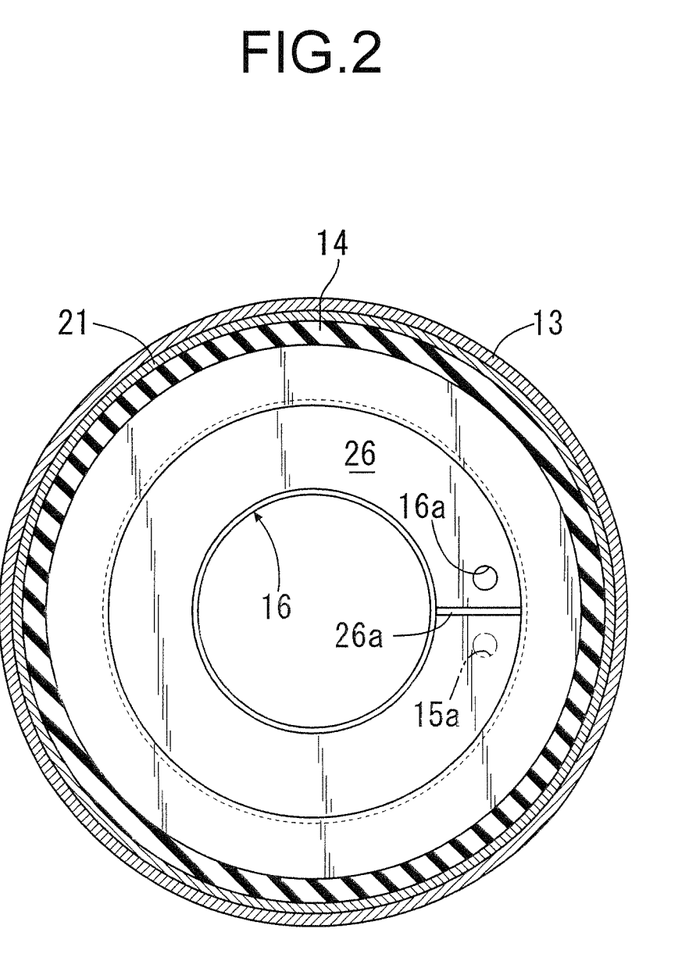
FIG. 2 is a cross-sectional view taken along the line 2-2 in FIG. 1.

The upper orifice 26 is defined between the first and second orifice-forming members 15 and 16 to be laid nearly over one round thereof (refer to FIG. 2). A partition wall 26a that defines the two end walls of the upper orifice 26 is welded to and between the first and second orifice-forming members 15 and 16. The upper orifice 26 communicates with the first liquid chamber 24 via a through-hole 15a of the first orifice-forming member 15 on one side of the partition wall 26a, and also communicates with the lower orifice 27 via a through-hole 16a of the second orifice-forming member 16 on the other side of the partition wall 26a.

Figure 3:
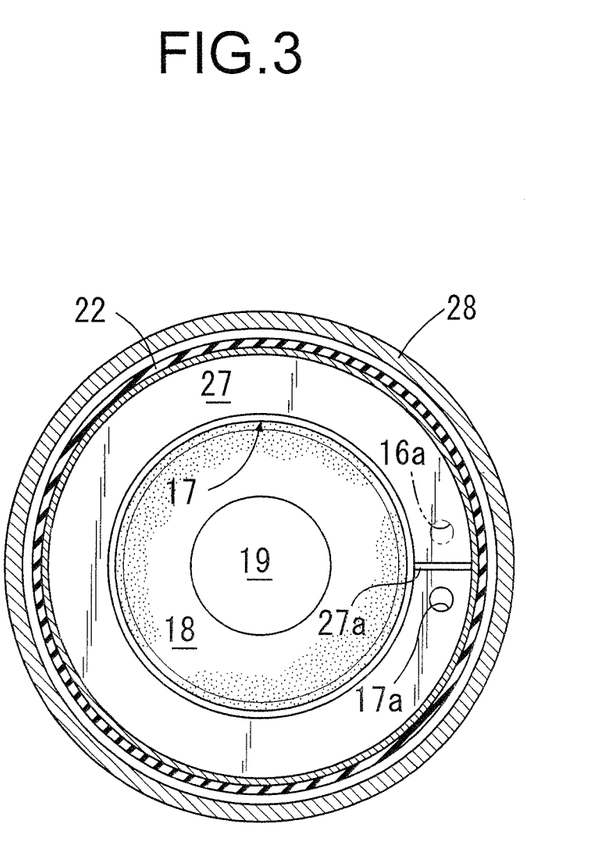
FIG. 3 is a cross-sectional view taken along the line 3-3 in FIG. 1.

The lower orifice 27 is defined between the second and third orifice-forming members 16 and 17 to be laid nearly over one round thereof (refer to FIG. 3). A partition wall 27a that defines the two end walls of the lower orifice 27 is welded to and between the second and third orifice-forming members 16 and 17. The lower orifice 27 communicates with the upper orifice 26 via the through-hole 16a on one side of the partition wall 27a, and also communicates with the second liquid chamber 25 via a through-hole 17a of the third orifice-forming member 17 on the other side of the partition wall 27a. In the above-described manner, the first and second liquid chambers 24 and 25 are allowed to communicate with each other via the upper and lower orifices 26 and 27 serially connected to each other.

A tubular bracket 28 is also fixed to the aforementioned crimping portion 13a. The active vibration isolation support system M is mounted on the vehicle body frame F in a way that the tubular bracket 28 is fastened to the vehicle body frame F. The tubular bracket 28 and the outer tube 13 constitute a support casing C of the active vibration isolation support system M.

An actuator supporting member 30 is fastened to the tubular bracket 28. The electromagnetic actuator 31, which drives the movable member 20, is supported by the actuator supporting member 30.

Figure 4:
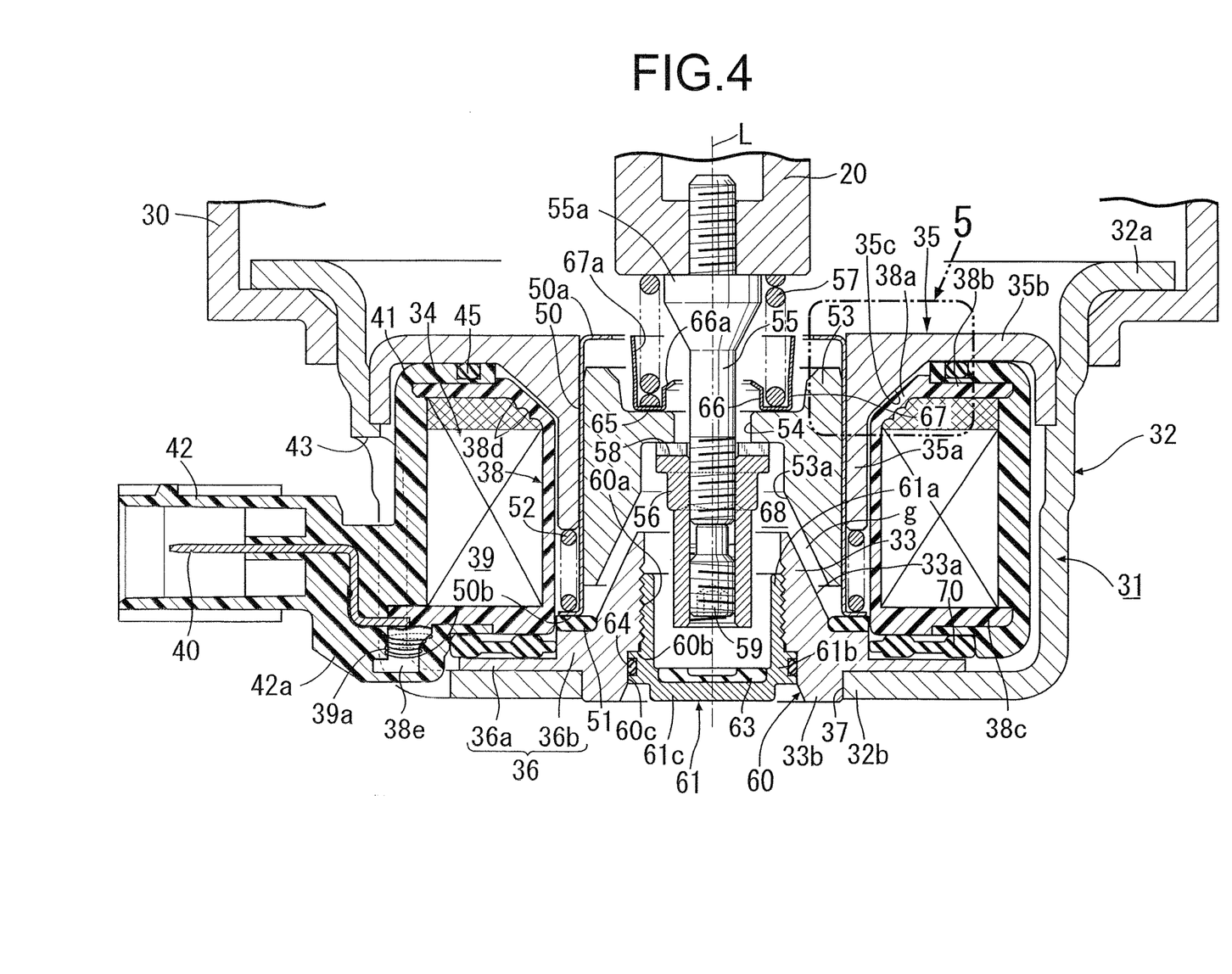
FIG. 4 is an enlarged view of a part indicated by the arrow 4 in FIG. 1.

Referring to FIG. 4, the actuator 31 includes a bottomed cylindrical housing 32 made of a magnetic material to have an opened upper surface. A flange 32a formed at an upper end of the housing 32 is fastened to the actuator supporting member 30. A fixed core 33, a coil assembly 34, and a yoke 35 are sequentially mounted inside the housing 32, made of the magnetic material. The fixed core 33 has an attraction surface 33a in an upper portion thereof, a positioning shaft 33b protruding from a lower surface thereof, and also a stepped brim flange 36 formed on an outer periphery thereof. The flange 36 is brought into close contact with a bottom wall 32b of the housing 32, and the positioning shaft 33b is press-fitted into a positioning hole 37 in the bottom wall 32b. In this way, the fixed core 33 is fastened to the housing 32.

The coil assembly 34 includes: a bobbin 38 made of a synthetic resin and disposed around the outer periphery of the fixed core 33; and a coil 39 wound around the bobbin 38. The bobbin 38 includes; upper flanges 38a and 38b positioned on the upper side thereof; and a lower flange 38c positioned on the lower side thereof. The outer-side upper flange 38b, which is positioned on the outer side in the radial direction, and the lower flange 38c extend in a direction orthogonal to the axis L, while the inner-side upper flange 38a, which is positioned on the inner side in the radial direction, is inclined to extend obliquely upward toward the first and second liquid chambers 24 and 25. As is clear from FIG. 5, stair-like step portions 38d each extending in the circumferential direction about the axis L are formed on the inner surface (surface facing the coil 39) of the inner-side upper flange 38a.

A small column 38e protruding downward is formed on the outer periphery of the lower flange 38c. When the small column 38e is formed, a base end portion of a coupler terminal 40 is inserted into and connected to the small column 38e. A lead wire 39a of the coil 39 is wound around the small column 38e, and then, the tip end of the lead wire 39a is connected to the coupler terminal 40 by soldering, electric welding, or the like.

After the lead wire 39a is connected to the coupler terminal 40, a cylindrical coil cover 41 is injection-molded with a synthetic resin so as to be in close contact continuously with both upper and lower end surfaces of the bobbin 38 as well as with the outer peripheral surface of the coil 39, thereby sealing the coil 39 onto the bobbin 38. At this time, a coupler 42 and a protrusion 42a are formed integrally in the coil cover 41. The coupler 42 protrudes outward in the radial direction of the cover 41 with the coupler terminal 40 held therein, while the protrusion 42a protrudes from the lower end surface of the cover 41 and covers the lead wire 39a and the small column 38e. This coupler 42 is arranged to be exposed to the outside of the housing 32 through an opening 43 provided continuously in the bottom wall 32b and the peripheral wall of the housing 32. The protrusion 42a is arranged in the opening 43 to be adjacent to the bottom wall 32b of the housing 32.

An annular sealing member 45 is fitted into the upper end surface of the coil assembly 34, in particular, into the upper end surface of the coil cover 41. Meanwhile, a sealing member 70 is interposed between the lower end surface of the coil assembly 34 and a thin outer peripheral portion 36a of the flange 36.

The yoke 35 is press-fitted into, and thus fixed to, the inner peripheral surface of the housing 32 so as to press and hold the coil assembly 34 against the flange 36. Due to this fixing, the sealing members 45 and 70 are compressed, so that the coil assembly 34 is elastically supported without play between the yoke 35 and the flange 36. As a result, the space in which the coil 39 and a movable core 53 are to be housed becomes a closed space 68, so that the waterproof performance is improved.

The yoke 35 includes: a cylindrical portion 35a facing the inner peripheral surface of the coil 39; and a flange portion 35b facing the upper end surface of the coil 39. In addition, an inner inclined surface 35c is formed in the inner side of an intersection of the cylindrical portion 35a and the flange portion 35b. The inner inclined surface 35c is inclined upward in such a manner that an outer side thereof in the radial direction comes closer to the liquid chambers 24 and 25. Accordingly, the inner inclined surface 35c of the yoke 35 is inclined along the inclined inner-side upper flange 38a of the bobbin 38.

A thin cylindrical bearing member 50 is slidably fitted on the inner peripheral surface of the cylindrical portion 35a, disposed on the inner periphery of the bobbin 38, of the yoke 35. An inward-facing flange 50a facing inward in the radial direction and an outward-facing flange 50b facing outward in the radial direction are integrally formed respectively on the upper end and the lower end of the bearing member 50. The outward-facing flange 50b overlaps a thick inner peripheral portion 36b of the flange 36 with an annular elastic plate 51 interposed in between. A set spring 52 made of a coil spring is provided in a compressed state between this outward-facing flange 50b and the fixed core 33. The provision of the set spring 52 allows the bearing member 50 to be elastically held on the flange 36, thus establishing the vibration isolation of the bearing member 50.

The elastic plate 51 serves also as a descending stopper for the movable core 53. Specifically, when the movable core 53 descends toward the fixed core 33, the elastic plate 51 receives as a cushion the lower end of the movable core 53 in order to avoid collision of both cores 33 and 53 with each other, thus defining the lower limit of the descending of the movable core 53.

The movable core 53 having an attraction surface 53a facing the attraction surface 33a of the fixed core 33 with an air gap g in between is slidably fitted into the bearing member 50. A through-hole 54 having a relatively large diameter is opened in the center portion of the movable core 53, and a connecting bolt 55 loosely penetrates the through-hole 54. The upper end of the connecting bolt 55 is screwed into the movable member 20, and an adjustment nut 56 is screwed onto the lower end portion of the connecting bolt 55 so as to pivotally support the lower end surface, around the through-hole 54, of the movable core 53. In this event, a set spring 57 is provided in a compressed state between the movable member 20 and the movable core 53 so as to retain the movable core 53 at a position at which the movable core 53 is to be pivotally supported by the adjustment nut 56. In this way, the movable core 53 is elastically sandwiched and held by the set spring 57 and the adjustment nut 56 screwed onto the connecting bolt 55 integrated with the movable member 20. A ventilation groove 58 extending in the radial direction and communicating with the through-hole 54 is formed in the upper end surface, which comes into pressure contact with the movable core 53, of the adjustment nut 56. The ventilation groove 58 allows the circulation of air between spaces respectively on the upper and lower sides of the movable core 53 to be smoothly carried out when the movable core 53 ascends or descends.

Advancing or retreating the screwed portion of the adjustment nut 56 with respect to the connecting bolt 55 makes it possible to adjust, in association with the set spring 57, the vertical position of the movable core 53, that is, the air gap g between the attraction surfaces 33a and 53a respectively of the fixed core 33 and the movable core 53. The adjusting position of the adjusting screw 56 is fixed with a locking screw 59 which is screwed into and fastened tightly to the adjustment nut 56 from below.

An adjustment operation hole 60 is provided in the center portion of the fixing core 33 so that the adjustment nut 56 can be inserted through the adjustment operation hole 60 or taken out therefrom. In addition, the lock screw 59 and the adjustment nut 56 can be operated with a tool to be inserted into the adjustment operation hole 60. The adjustment operation hole 60 comprises a threaded hole 60a and a fitting hole 60c which has a larger diameter than that of the screw hole 60a, and which continues from the lower end of the screw hole 60a with an annular shoulder portion 60b in between. Meanwhile, a closure member 61 for closing the adjustment operation hole 60 has a bottomed cylindrical shape with an opened upper surface, and includes a threaded tube 61a, a brim portion 61b, and a bottom portion 61c. The threaded tube 61a is screwed into the threaded hole 60a while receiving the adjustment nut 56. The brim portion 61b is fitted into the fitting hole 60c. Moreover, a sealing member 64 is mounted on the outer periphery of the brim portion 61b so as to be brought into close contact with the inner peripheral surface of the fitting hole 60c.

Accordingly, the adjustment operation hole 60 can be closed in a watertight manner by using the closure member 61 in a way that the threaded tube 61a is screwed into and fastened tightly to the threaded hole 60a until the brim portion 61b fitted into the fitting hole 60c is caused to abut on the shoulder portion 60b.

An elastic plate 63 is joined to the upper surface of the bottom portion 61c of the closure member 61. The bottom portion 61c receives in a buffered manner the lower end of the adjustment nut 56 with the elastic plate 63 in between, thus defining the lower limit of the descending of the movable member 20. The adjustment nut 56 abuts against the bottom portion 61c of the closure member 61 only when the movable member 20 further descends while compressing the set spring 57 after the movable core 53 reaches its aforementioned lower limit in association with the descending of the movable member 20.

In the bearing member 50, the attraction surfaces 33a and 53a, facing each other, of the fixed core 33 and the movable core 53 respectively are both formed in conical surfaces so as to define the air gap g having a conical tubular shape between these surfaces 33a and 53a. The attraction surface 53a of the movable core 53 is arranged to surround the attraction surface 33a of the fixed core 33. This structure provides a relatively large attractive force and a relatively large stroke of the movable core 53 even by use of the fixed core 33 and the movable core 53 each having a relatively small diameter in the bearing member 50.

Moreover, because the attraction surface 53a of the movable core 53 is formed on the inner peripheral surface side of the core 53, a sufficiently long supporting span of the movable core 53 by the bearing member 50 can be secured regardless of the attraction surface 53a, and thus, stable ascending and descending of the movable core 53 can be ensured. In this respect, forming a layer of a low friction material, such as Teflon (registered trademark), on the outer peripheral surface of the movable core 53 is effective in terms of achieving more stable and smooth ascending and descending of the movable core 53.

The set spring 57 is a coil spring, and is fitted onto a large diameter portion 55a of the base portion of the connecting bolt 55 so as to be arranged concentrically with the connecting bolt 55. In addition, an annular spring seat 65 made of a steel plate is provided between the set spring 57 and the movable core 53 in order to prevent the movable core 53 from being worn down. The spring seat 65 has inner and outer concentric positioning tubular portions 66 and 67 standing up respectively along the inner and outer peripheral faces of the set spring 57 from the inner and outer peripheral edge portions of the spring seat 65. The outer positioning tubular portion 67 is formed to be longer than the inner positioning tubular portion 66. Funnel portions 66a and 67a are formed in the upper end portions of the respective positioning tubular portions 66 and 67, so that the set spring 57 can be easily inserted between these positioning tubular portions 66 and 67. Moreover, a layer of a low friction material, such as Teflon (registered trademark), is formed on at least one of the abutting surfaces, facing each other, of the spring seat 65 and the movable core 53, so that a favorable sliding performance of the spring seat 65 with respect to the movable core 53 is obtained.

Referring back to FIG. 1 again, an electronic control unit U is connected to the coil 39 of the actuator 31 via the coupler 42. The electronic control unit U receives various detection signals from an engine revolution number sensor Sa for detecting the revolution number, a load sensor Sb for detecting the load inputted to the active vibration isolation support system M, and an acceleration sensor Sc for detecting the acceleration acting on the engine E.

Next, the operation of the embodiment will be described.

When the actuator 31 of the active vibration isolation support system M is in a non-operating state, the pressures of the first and second liquid chambers 24 and 25 communicating with each other via the upper and lower orifices 26 and 27 are maintained at the same level. However, the pressure receiving area in the first liquid chamber 24 of the first cap member 19 connected to the movable member 20 is larger than that in the second liquid chamber 25. For this reason, a downward load with a magnitude obtained by multiplying the difference between these areas by the pressure of the first liquid chamber 24 is exerted on the movable member 20. Accordingly, the movable member 20 halts at a position where the load and the repulsive force of the second elastic body 18 against the load are balanced out, so that a predetermined initial air gap g is formed between the attraction surfaces 33a and 53a of the fixed core 33 and the movable core 53.

When shake vibration of low frequency occurs in the engine E during the traveling of the vehicle, a load is inputted from the engine E to the first elastic body 14, so that the first elastic body 14 is deformed. The deformation of the first elastic body 14 changes the volume of the first liquid chamber 24, thus causing the liquid to move between the first and second liquid chambers 24 and 25 communicating with each other via the upper and lower orifices 26 and 27. Expansion and contraction of the first liquid chamber 24 causes contraction and expansion of the volume of the second liquid chamber 25, respectively. This change in volume of the second liquid chamber 25 is absorbed by the elastic deformation of the diaphragm 22. The shape and dimensions of each of the upper and lower orifices 26 and 27 as well as the spring constant of the first elastic body 14 are set so that a high spring constant and a high attenuation force can be exhibited in the frequency domain of the above-described shake vibration. Accordingly, the vibration transmitted from the engine E to the vehicle body frame F can be effectively reduced.

The actuator 31 is kept in the non-operating state when the engine E is operating in such shake vibration range of the low frequency.

Consider a case where vibration of a frequency higher than that of the shake vibration occurs in the engine E, that is, where idling vibration or booming noise vibration, which may occur during the idling of the engine E, occurs. In this case, the liquid in the upper and lower orifices 26 and 27 connecting the first and second liquid chambers 24 and 25 to each other is brought into a stick state, so that a vibration isolation function cannot be exhibited. For such an occasion, the actuator 31 is driven to activate its vibration isolation function.

In other words, the electronic control unit U controls the energization to the coil 39 of the actuator 31 on the basis of the detection signals inputted thereto from the engine revolution number sensor Sa, the load sensor Sb, the acceleration sensor Sc, and the like. Specifically, when the engine E is displaced downward due to vibration, the first elastic body 14 is deformed downward. The deformation of the first elastic body 14 decreases the volume of the first liquid chamber 24, thus increasing the hydraulic pressure therein. In this case, the coil 39 is magnetized, so that the movable core 53 is attracted toward the fixed core 33. As a result, the movable core 53 descends while deforming the second elastic body 18, thus increasing the volume of the first liquid chamber 24. In this way, an increase in the pressure in the first liquid chamber 24 can be suppressed. Eventually, the active vibration isolation support system M generates an active supporting force that prevents the transmission of a downward load from the engine E to the vehicle body frame F.

On the other hand, when the engine E is displaced upward, the volume of the first liquid chamber 24 is increased, and the pressure in the chamber 24 is decreased. In this case, the coil 39 is demagnetized, so that the movable core 53 is released. As a result, the movable core 53 ascends due to the repulsive force of the second elastic body 18, thus decreasing the volume of the first liquid chamber 24. In this way, a decrease in the pressure in the chamber 24 can be suppressed. Eventually, the active vibration isolation support system M generates an active supporting force that prevents the transmission of an upward load from the engine E to the vehicle body frame F.

During such operations as described above, an excessive increase in the downward load from the engine E to the first elastic body 14 rapidly increases the pressure in the first liquid chamber 24, so that the excessive downward load is exerted on the movable member 20. In such a case, the movable member 20 firstly causes the movable core 53 to descend to the lower limit of its decent, that is, to descend until the lower end surface of the core 53 abuts against the elastic plate 51 on the thick inner peripheral portion 36$b$ of the flange 36. Thereafter, the set spring 57 is compressed and deformed to separate the adjustment nut 56 from the lower surface of the movable core 53, so that the movable member 20 is allowed to move further toward the fixed core 33. Accordingly, the set spring 57 absorbs the excessive load on the movable member 20, so that the contact of the fixed core 33 and the movable core 53 with each other and the acting of the excessive load on the movable core 53 and the elastic plate 51 are prevented. As a result, the durability of these above components can be secured.

If the amount of descent of the movable member 20 reaches a predetermined amount after the movable core 53 reaches the lower limit of its descent, the adjustment nut 56 abuts against, with the elastic plate 63 in between, the bottom portion 61$c$ of the closure member 61 fastened to the fixed core 33, so that an excessive increase in the load on the set spring 57 is suppressed. Accordingly, an excessive increase in the load on the fixed core 33 and the movable core 53 can be prevented.

In the meantime, since the inner inclined surface 35$c$ inclined upward on the outer side thereof in the radial direction is formed in the inner side of an intersection of the cylindrical portion 35$a$ and the flange portion 35$b$ in the yoke 35, the following effect is obtained. Specifically, with this structure, the vector of the magnetic flux generated by the energization of the coil 39 is oriented toward the movable core 53 from the flange portion 35$b$ of the yoke 35 via the inner inclined surface 35$c$ thereof. Accordingly, the magnetic flux is allowed to flow smoothly from the yoke 35 to the movable core 53, so that the efficiency of the magnetic circuit is enhanced. As a result, the operational response of the actuator 31 can be improved (refer to the arrow A in FIG. 5). It is considered that the flow of the magnetic flux from the yoke 35 to the movable core 53 is smoothed because the direction of the magnetic flux is rectified toward the movable core 53 by the inner inclined surface 35$c$ of the yoke 35.

Figure 6:
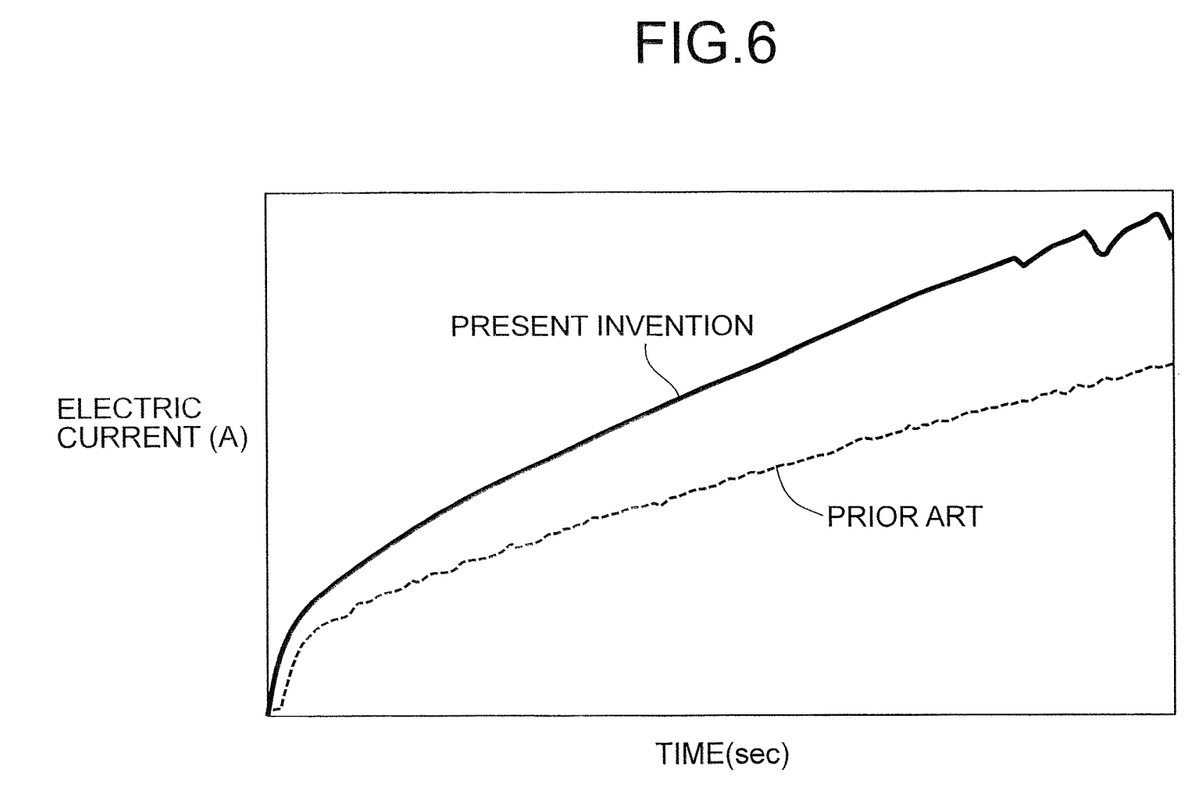
FIG. 6 is a graph for explaining the effects of the present invention.

In addition, since the inner-side upper flange 38$a$ of the bobbin 38 is inclined to extend obliquely upward and in a direction of separating from the lower flange 38$c$, the coil 39 of this embodiment has a cross-sectional area larger by the area of the shaded portion in FIG. 4 than the coil described in Japanese Patent Application Laid-open No. 2004-291737. Accordingly, the number of windings of the coil 39 can be increased by the increase in the area. Suppose a case where the upper flange is displaced upward while keeping its posture orthogonal to the axis L in order to increase the number of windings of the coil. In this case, the dimension in the direction of the axis L of the active vibration isolation support system M is also increased by the displacement of the upper flange. On the other hand, in this embodiment, each of the upper flanges 38$a$ and 38$b$ is inclined upward while extending from the inside to the outside in the radial direction as a whole. Such a structure as that of this embodiment makes it possible to efficiently utilize the dead space surrounded by the inner peripheral portion of the flange 32$a$ of the housing 32. As a result, it is possible to increase the number of windings of the coil 39 without increasing the dimension, in the direction of the axis L, of the active vibration isolation support system M. Further, if the coil 39 is wound only the same number of times as the conventional coil, the outside diameter of the coil 39 can be reduced as compared with that of the conventional coil, so that the total length of the wire of the coil 39 can be shortened. Accordingly, since the resistance and inductance are reduced, the electric current response can be improved (refer to FIG. 6).

Figure 5:
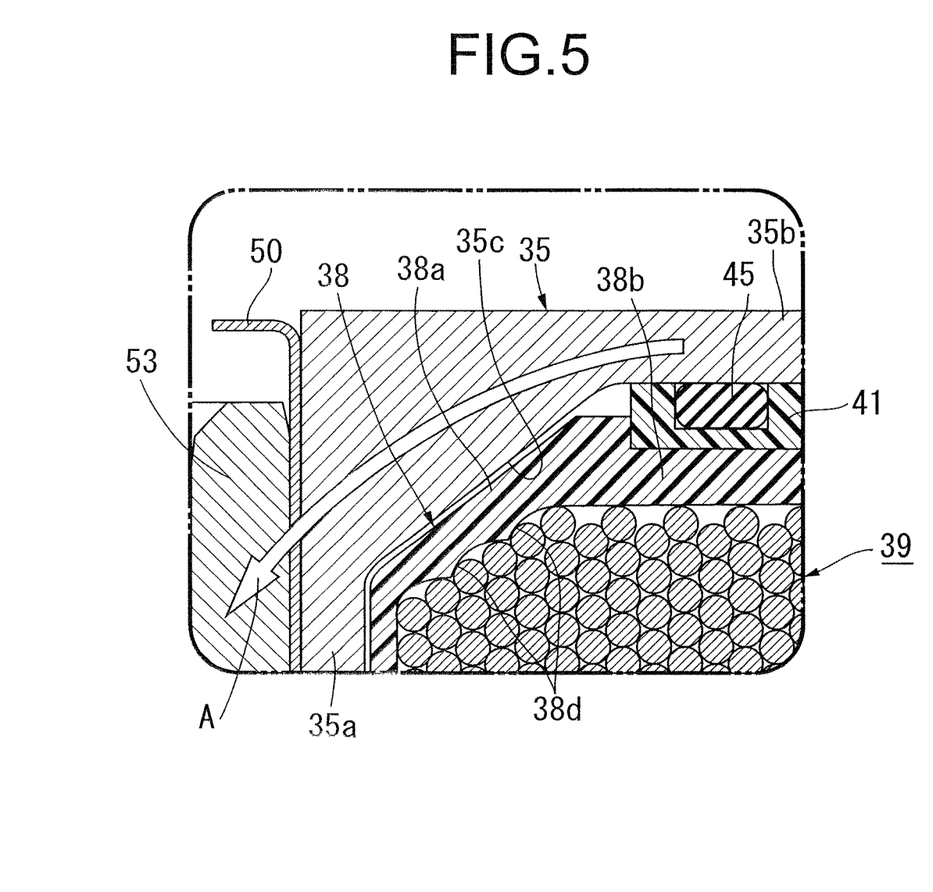
FIG. 5 is an enlarged view of a part indicated by the arrow 5 in FIG. 4.

Moreover, the stair-like step portions 38$d$ are formed on the inner surface of the inner-side upper flange 38$a$ of the bobbin 38. For this reason, when being wound around the bobbin 38, the wire of the coil 39 is hung on these step portions 38$d$, thus making it unlikely that the wound wire is loosened. As a result, the winding can be facilitated and also secured.

Figure 7:
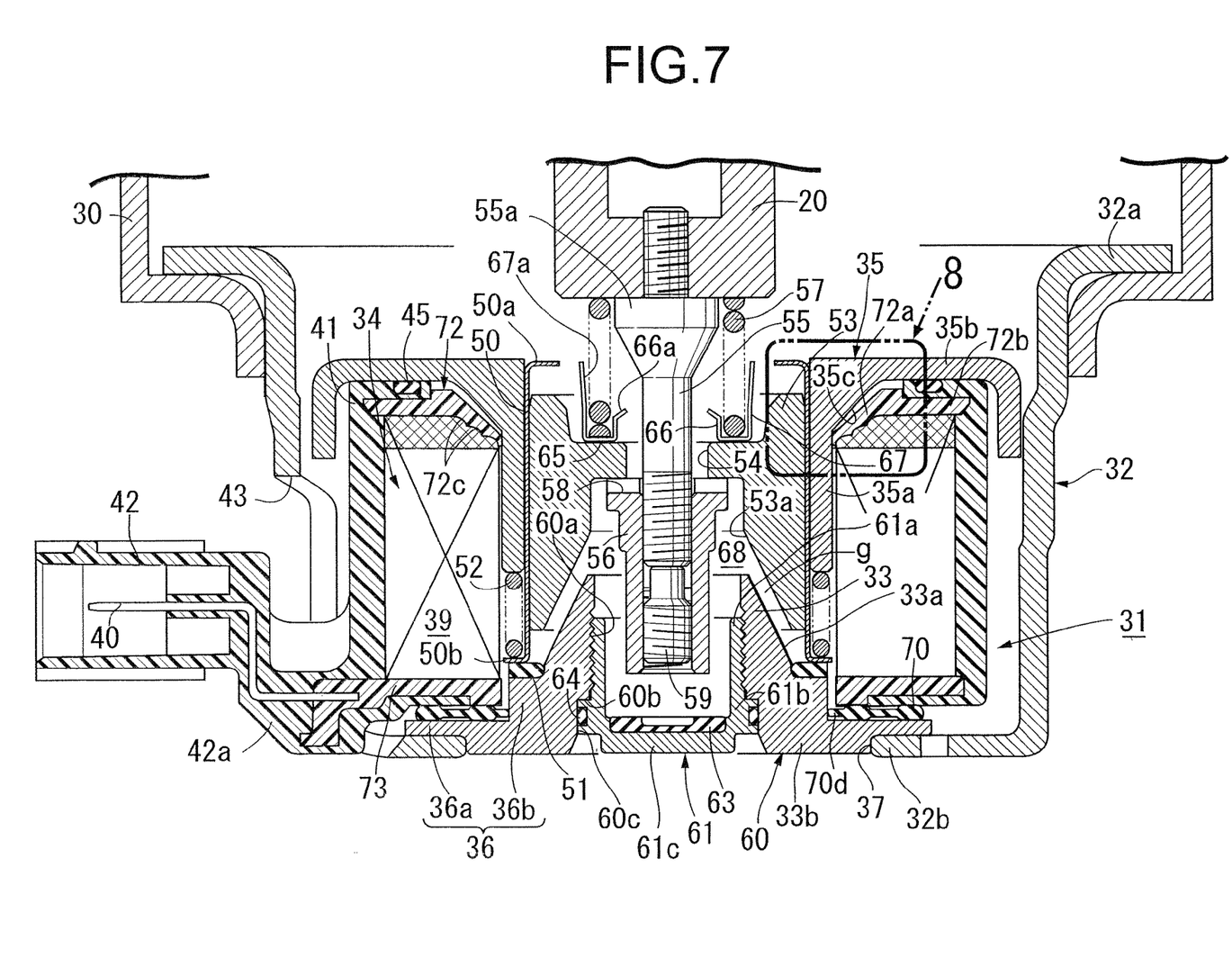
FIG. 7 is a view corresponding to FIG. 4.
Figure 8:
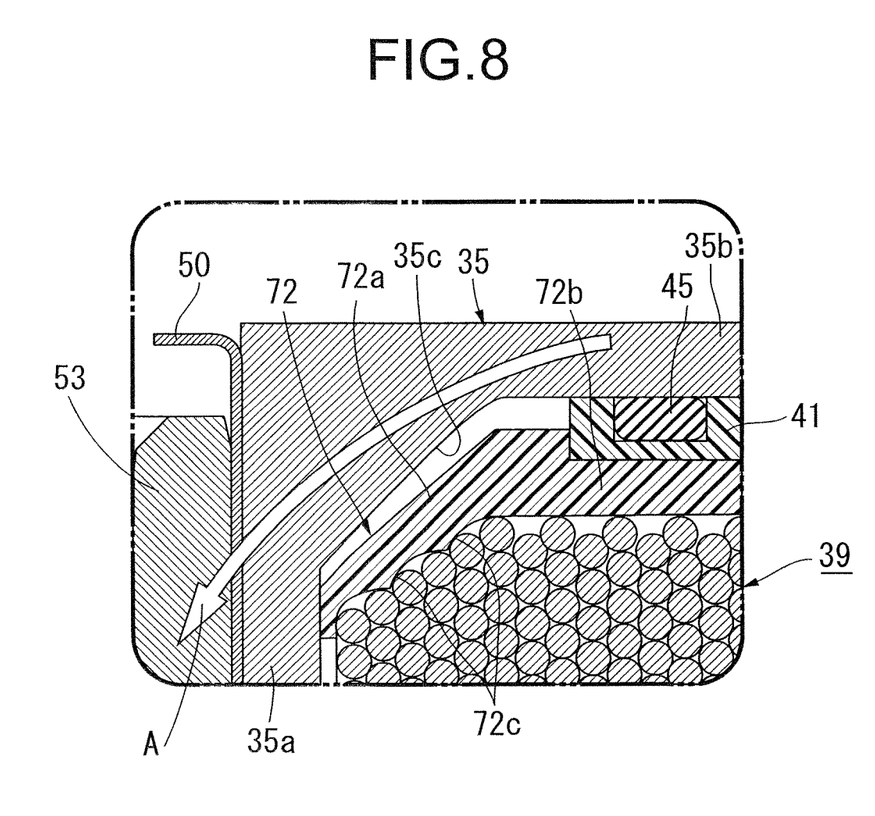
FIG. 8 is an enlarged view of a part indicated by the arrow 8 in FIG. 7.

FIGS. 7 and 8 show a second embodiment of the present invention. In the second embodiment, components corresponding to those described in the first embodiment are denoted by the same reference numerals as those in the first embodiment, and thus the description of those components will be omitted.

While the coil 39 of the first embodiment includes the bobbin 38, the coil 39 of the second embodiment is formed of a bobbinless coil not including a bobbin. Except that the coil 39 does not include a bobbin, the configuration of the second embodiment is substantially the same as that of the first embodiment. Upper and lower surfaces of the coil 39 wound in a cylindrical shape are covered respectively with an upper plate 72 and a lower plate 73. The coil cover 41 is molded so as to cover an upper surface of an outer peripheral portion of the upper plate 72 as well as a lower surface of an outer peripheral portion of the lower plate 73.

The upper plate 72 includes: an inner portion 72a inclined to extend obliquely upward while being separated from the axis L; and an outer portion 72b extending in a direction orthogonal to the axis L. In addition, stair-like step portions 72c . . . each extending in the circumferential direction about the axis L are formed on an inner surface (surface facing the coil 39) of the inner portion 72b.

According to the second embodiment, the following operational effect can be further achieved by employing the bobbinless coil 39, in addition to the operational effect of the first embodiment. Specifically, this configuration makes it possible not only to reduce the number of components and the manufacturing costs by eliminating the bobbin, but also to reduce the inner diameter of the coil 39 by an amount corresponding to the elimination of the bobbin. Moreover, the reduction in the inner diameter of the coil 39 makes it possible to reduce a required length of wire for ensuring a necessary number of the winding. Accordingly, since the resistance and inductance of the coil 39 are reduced, the electrical current response can be improved.

Furthermore, as in the case of the first embodiment, the second embodiment also provides the following effect. Specifically, the operation of the inner inclined surface 35c of the yoke 35 allows the magnetic flux to flow smoothly from the yoke 35 to the movable core 53, thereby enhancing the efficiency of the magnetic circuit. Accordingly, the operational response of the actuator 31 can be improved.

Figure 9A:
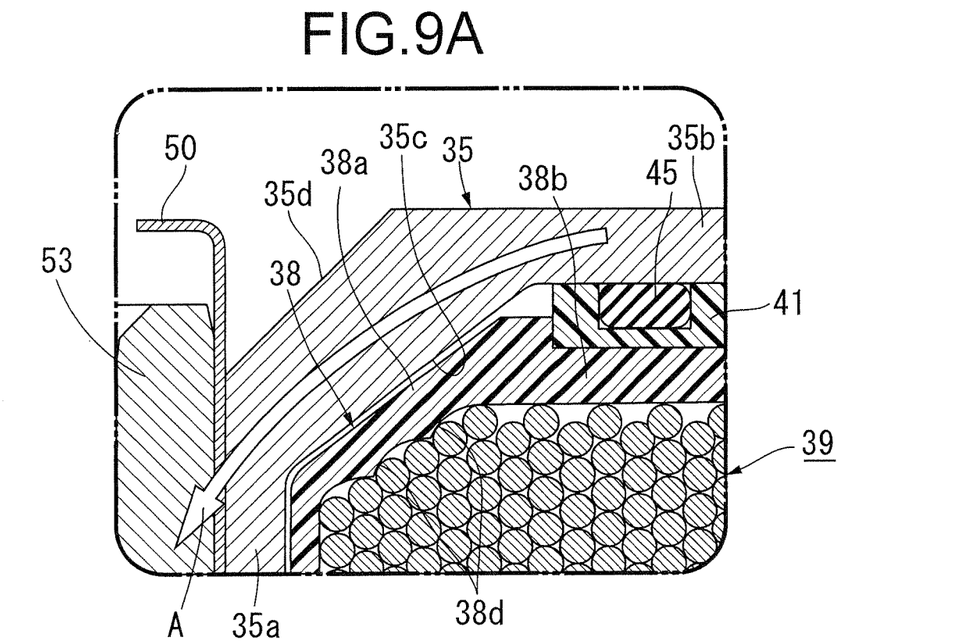
Figure 9B:
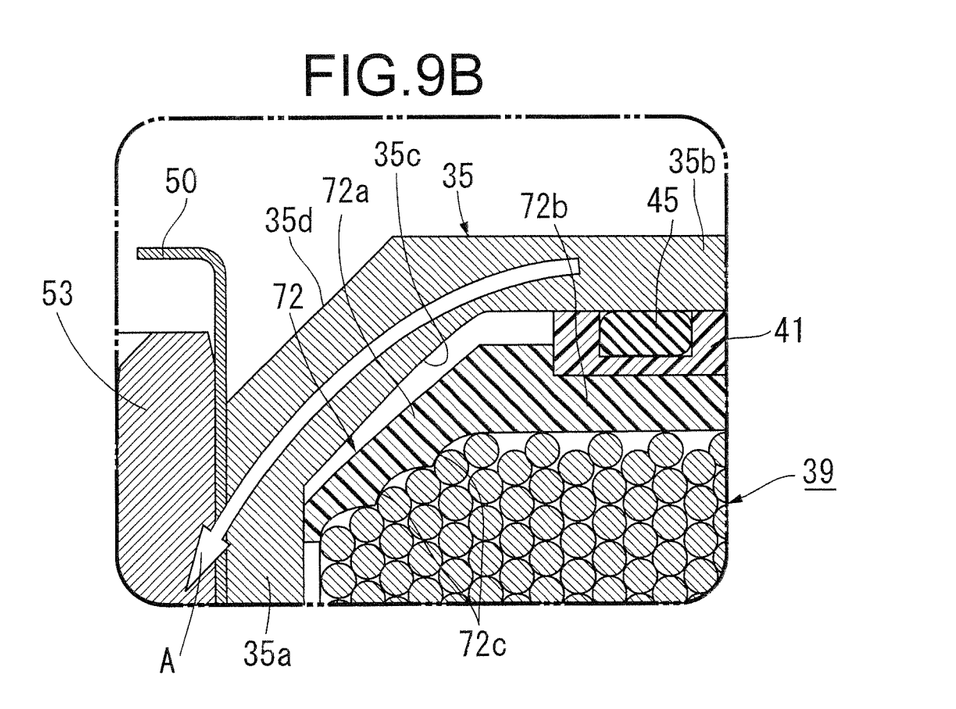

Next, third and fourth embodiments of the present invention will be described below with reference to FIGS. 9A and 9B.

Each of the first and second embodiments includes the inner inclined surface 35c formed in the inner side of the intersection of the cylindrical portion 35a and the flange portion 35b in the yoke 35. In addition, the inner inclined surface 35c is inclined in such a manner that the outer side thereof in the radial direction with respect to the axis L comes closer to the first and second liquid chambers 24 and 25 side.

On the other hand, each of the third and fourth embodiments further includes an outer inclined surface 35d extending in parallel to the inner inclined surface 35c.

Since the inner inclined surface 35c as well as the outer inclined surface 35d are formed at the intersection of the cylindrical portion 35a and the flange portion 35b in the yoke 35, it is possible to prevent an unnecessary increase in the thickness of the yoke 35, and also, to reduce the weight while avoiding reduction in the magnetic efficiency of the yoke 35 defining the magnetic path.

Although the embodiments of the present invention have been described so far, various modifications in design may be made on the present invention without departing from the scope of the present invention.

What is claimed is:

1. An active vibration isolation support system comprising:
   an actuator for reciprocally oscillating a movable core on an axis of the actuator by energizing a coil wound in a cylindrical shape;
   a liquid chamber being disposed on the axis of the actuator, having a volume which varies depending on a load inputted thereto from an outside, and being connected to the movable core, so that an internal pressure of the liquid chamber is controlled; and
   a bobbin around which the coil is wound,
   wherein the actuator comprises a yoke, the yoke including:
      a cylindrical portion facing an inner peripheral surface of the coil;
      a flange portion facing an end surface, on the liquid chamber side, of the coil; and
      an inner inclined surface formed in an inner side of the yoke at an intersection of the cylindrical portion and the flange portion, the inner inclined surface being inclined in such a manner that an outer side thereof in a radial direction with respect to the axis comes closer to the liquid chamber than an inner side thereof in a radial direction with respect to the axis,
   wherein the end surface, only on the liquid chamber side of the coil, is inclined, and
   wherein a step portion extending in a circumferential direction with respect to the axis is formed on an inner surface of the bobbin, the inner surface being in contact with the inclined end surface of the coil.

2. The active vibration isolation support system according to claim 1 wherein an outer inclined surface is formed in an outer side of the intersection of the cylindrical portion and the flange portion, the outer inclined surface being inclined in such a manner that an outer side thereof in the radial direction with respect to the axis comes close to the liquid chamber.

* * * * *